United States Patent
Wang et al.

(10) Patent No.: US 8,223,735 B2
(45) Date of Patent: Jul. 17, 2012

(54) MULTI-CARRIER CODE DIVISION MULTIPLE ACCESS BEAMFORMING

(75) Inventors: Genyuan Wang, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 866 days.

(21) Appl. No.: 12/335,990

(22) Filed: Dec. 16, 2008

(65) Prior Publication Data

US 2010/0150127 A1    Jun. 17, 2010

(51) Int. Cl.
    *H04B 7/216*    (2006.01)
(52) U.S. Cl. .................................... 370/342; 370/441
(58) Field of Classification Search .......... 370/319–320, 370/335, 342, 441
    See application file for complete search history.

(56) References Cited

U.S. PATENT DOCUMENTS 7,027,421 B2 *  4/2006  Park et al. .................. 370/335
7,031,290 B2 *  4/2006  Ertel et al. .................. 370/342
2003/0048760 A1 *  3/2003  Park et al. .................. 370/295

* cited by examiner

*Primary Examiner* — Phuc Tran
(74) *Attorney, Agent, or Firm* — Edell, Shapiro & Finnan, LLC

(57) ABSTRACT

Techniques are provided to performing beamforming on a wireless communication link that employs multi-carrier code division multiple access (MC-CDMA) signal formatting techniques. At a first wireless communication device, a waveform is received at each of a plurality of antennas, where the waveform comprises a multi-carrier code division multiple access ranging transmission from each of one or more of a plurality of second wireless communication devices such that MC-CDMA ranging transmissions from two or more second wireless communication devices overlap in time and frequency. All codes in a set of possible codes that may be used by the second wireless communication devices are searched to determine whether which codes in the set are present in the one or more MC-CDMA ranging transmissions contained in the received waveform. For each of the one or more codes that are determined to be present in the received waveform, estimated channel path responses are computed at each of the plurality of antennas of the first wireless communication device. A downlink beamforming weight vector is computed from the estimated channel path responses computed for a corresponding code.

22 Claims, 6 Drawing Sheets

MULTI-CARRIER CODE DIVISION MULTIPLE ACCESS BEAMFORMING

TECHNICAL FIELD

The present disclosure relates to beamforming techniques in wireless communication systems.

BACKGROUND

Multi-carrier code division multiple access (MC-CDMA), multiple-input multiple-output (MIMO) and beamforming technologies are proposed as candidates for next generation broadband wireless communication systems. For example, MC-CDMA, MIMO and beamforming techniques have been considered key technologies for the IEEE 802.16m communication standard to be used in next generation WiMAX™ systems.

Beamforming signals formatted in accordance with MC-CDMA techniques is challenging. Channel information between the transmit antennas and the intended receiver antenna(s) needs to be known in order to perform beamforming effectively. The channel information may be frequency dependent. When beamforming, the same signal is transmitted from multiple transmit antennas with different magnitudes and phases so that the signals from multiple transmit antennas are optimally combined at the intended receiver antenna(s). The magnitudes and phases are determined based on the channel information.

The channel information between the transmit antennas of a first device and the receiver antenna(s) of a second device can be obtained from signals transmitted by the second device to the first device when the property of the channel symmetry is utilized. For example, a wireless base station can derive the downlink channel information based on uplink signals sent from a wireless mobile station.

For a base station to compute channel information for each wireless mobile station, the uplink signals from different mobile stations need to be separated in frequency and time. This is generally not the case with MC-CDMA communication techniques.

When using MC-CDMA techniques, the received uplink signals from one mobile station overlaps (in frequency and time) with the uplink signals of other mobile stations. MC-CDMA techniques, by design, spread and overlap signals of all mobile stations over a frequency spectrum. For example, in a WiMAX system, when a mobile station initially enters a network, it sends a wide band uplink ranging signal (i.e., a CDMA signal) in a frequency band shared by other mobile stations. The received signal at the base station is a combination of the uplink signals from multiple mobile stations.

Since MC-CDMA techniques spread the signal over a relatively wide frequency spectrum, there are not enough uplink symbols within the channel coherent bandwidth for a reliable channel information computation. Furthermore, in a multi-path environment, the channel information is frequency dependent, which makes computing the channel information even more complex.

Convention beamforming schemes cannot be used for MC-CDMA signal formatting techniques. A new scheme is needed for computing beamforming weight vectors based on channel information derived from signals transmitted according to MC-CDMA techniques.

DESCRIPTION OF EXAMPLE EMBODIMENTS

Overview

Techniques are provided to perform beamforming on a wireless communication link that employs multi-carrier code division multiple access (MC-CDMA) signal formatting techniques. At a first wireless communication device, a waveform is received at each of a plurality of antennas, where the waveform comprises a MC-CDMA transmission from each of one or more of a plurality of second wireless communication devices such that MC-CDMA ranging transmissions from two or more second wireless communication devices overlap in time and frequency. All codes in a set of possible codes that may be used by the second wireless communication devices are searched to determine which codes are present in the one or more MC-CDMA ranging transmissions contained in the received waveform. For each of the one or more codes that are determined to be present in the received waveform, estimated channel path responses are computed at each of the plurality of antennas of the first wireless communication device. A downlink beamforming weight vector is computed from the estimated channel path responses computed for a corresponding code.

The techniques described herein are useful when the multiple uplink (ranging) transmission from multiple mobile stations overlap in time and frequency, and particularly when the uplink ranging transmissions occupy a wideband channel that is composed of several disconnected subbands/subcarriers and the total bandwidth occupied by the uplink transmission exceeds the coherent channel bandwidth. While the techniques described herein are made with respect to a WiMAX ranging signal, it is to be understood that these techniques can be applied to any system that uses MC-CDMA techniques.

Figure 1:
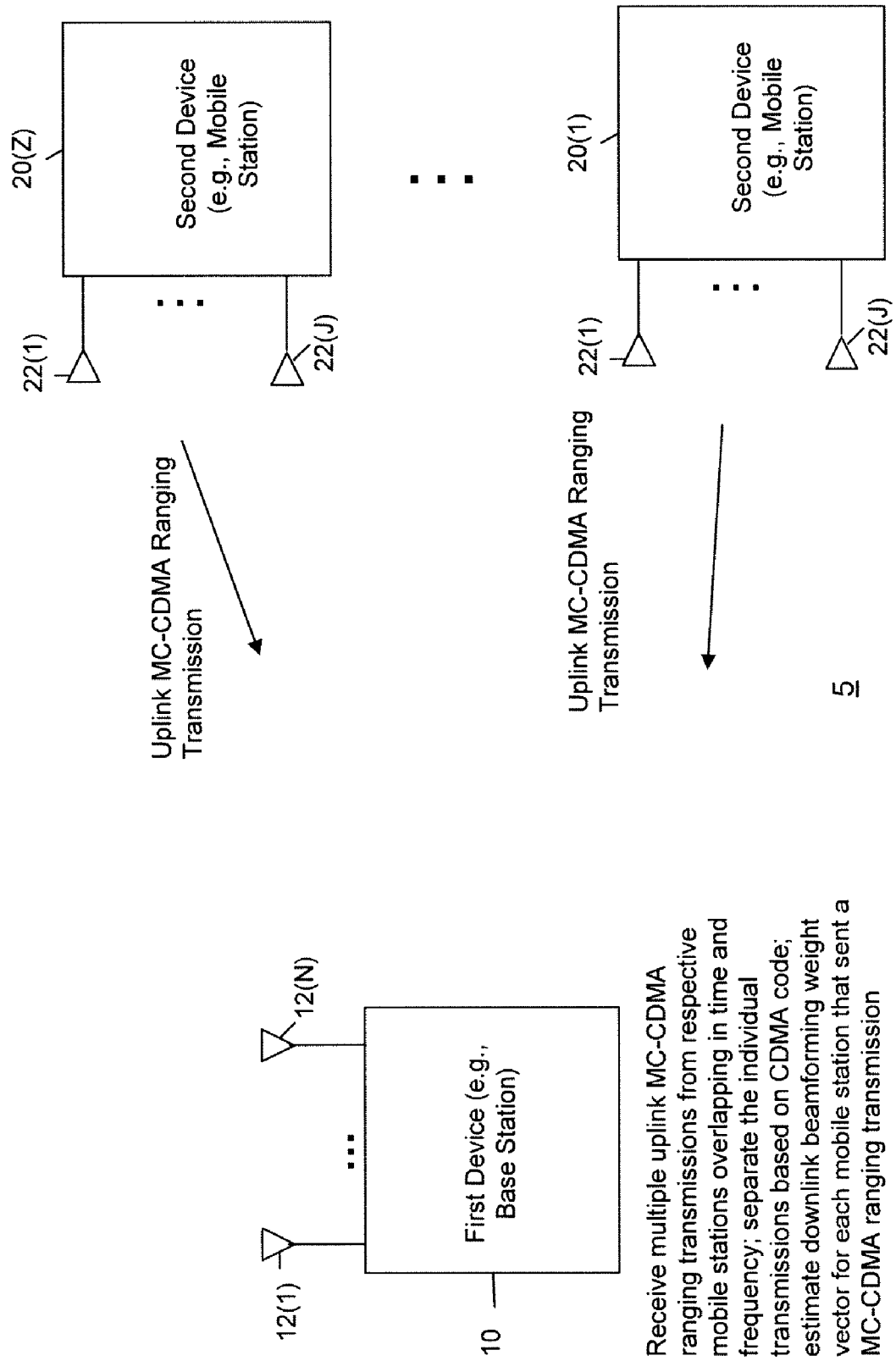
FIG. 1 is a block diagram of a wireless communication system in which a first wireless communication device (e.g., a base station) is configured to generate downlink beamforming weight vectors from multiple overlapping (in time and frequency) uplink code division multiple access ranging transmissions received at a plurality of antennas of the first wireless communication device.

Referring first to FIG. 1, a wireless communication system is shown generally at reference numeral 5. The system 5 comprises a first wireless communication device 10 and a plurality of second wireless communication devices 20(1)-20(Z). The first device 10 is, for example, a base station (BS) and the second devices are mobile stations (MSs). The BS 10 and the MSs 20(1)-20(Z) may be configured to communicate using the techniques of the IEEE 802.16e communication standard, also known commercially as WiMAX™. The BS 10 comprises N plurality of antennas 12(1)-12(N) and each of the MSs 20(1)-20(Z) comprises one or more antennas 22(1)-22(J).

During an initial setup or other phase of communication, one or more (or all) of the MSs 20(1)-20(Z) will transmit an uplink MC-CDMA ranging transmission to the BS 10. The uplink ranging transmissions from the two or more MSs overlap in frequency and time. The BS 10 receives at its multiple antennas 12(1)-12(N) the ranging transmissions from the MSs and is configured to separate the individual transmissions based on their CDMA codes and estimate a downlink beamforming weight vector for each MS that sent a ranging transmission.

Figure 2:
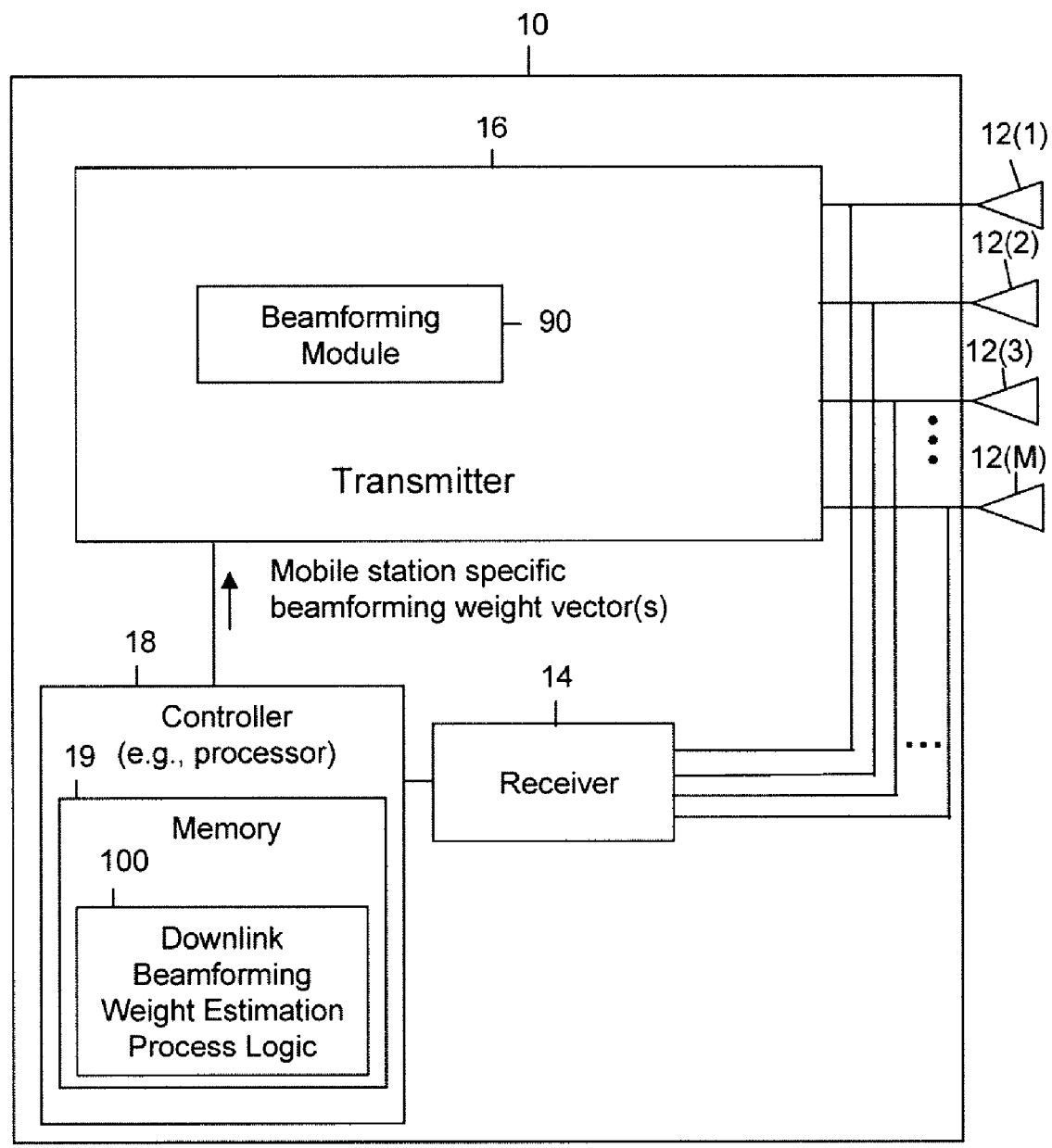
FIG. 2 is a block diagram of a base station configured to generate downlink beamforming weight vectors from the received overlapping ranging transmissions.

Referring now to FIG. 2, an example of a block diagram of the BS 10 is described. The BS 10 comprises a receiver 14, a transmitter 16 and a controller 18. The controller 18 supplies data to the transmitter 16 to be transmitted and processes signals received by the receiver 14. In addition, the controller 18 performs other transmit and receive control functionality. Parts of the functions of the receiver 14, transmitter 16 and controller 18 may be implemented in a modem and other parts of the receiver 14 and transmitter 16 may be implemented in radio transmitter and radio transceiver circuits. It should be understood that there are analog-to-digital converters (ADCs) and digital-to-analog converters (DACs) in the various signal paths to convert between analog and digital signals.

The receiver 14 receives the signals detected by each of the antennas 12(1)-12(N) and supplies corresponding antenna-specific receive signals to the controller 18. It is understood that the receiver 14 may comprise a plurality of individual receiver circuits, each for a corresponding one of a plurality of antennas 12(1)-12(N) and which outputs a receive signal associated with a signal detected by a respective one of the plurality of antennas 12(1)-12(N). For simplicity, these individual receiver circuits are not shown. The transmitter 16 may comprise individual transmitter circuits that supply respective upconverted signals to corresponding ones of a plurality of antennas 12(1)-12(N) for transmission. For simplicity, these individual transmitter circuits are not shown.

The controller 18 is, for example, a signal or data processor that comprises a memory 19 or other data storage block that stores data used for the techniques described herein. The memory 19 may be separate or part of the controller 18. In addition, instructions associated with downlink beamforming weight estimation process logic 100 may be stored in the memory 19 for execution by the controller 18.

The functions of the controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein and stores software or processor instructions that are executed to carry out the computations described herein. Thus, the process 100 may be implemented with fixed logic or programmable logic (e.g., software/computer instructions executed by a processor) and the controller 18 may be a programmable processor, programmable digital logic (e.g., field programmable gate array) or an application specific integrated circuit (ASIC) that comprises fixed digital logic, or a combination thereof. For example, the controller 18 may be a modem in the BS 10 and thus be embodied by digital logic gates in a fixed or programmable digital logic integrated circuit.

The downlink beamforming weight estimation process 100 generates a downlink beamforming weight vector specific to each MS that transmits an uplink ranging signal. The mobile station specific beamforming weight vector is supplied to the transmitter 16 where a beamforming module 90 applies the beamforming weight vector to a signal to be beamformed to a specific MS.

When one or more MSs transmit ranging signals to the BS, each MS randomly selects one of a plurality of ranging (i.e., CDMA) codes from a predetermined group or set G of possible ranging codes. In an example of a WiMAX system, each ranging code is a binary sequence with a length of 144. The ranging signal is transmitted in a designated ranging frequency region (ranging band) in which signals are transmitted in accordance with an orthogonal frequency division multiplexed (OFDM) format comprised of a plurality of subcarriers spread over a frequency band. For example, in the WiMAX standard, there is a mode called a partially used subcarrier (PUSC) mode for the downlink and the uplink. A "tile" structure is defined for the uplink PUSC mode in which the available subcarriers in the frequency band space are split into tiles. Multiple tiles, chosen from across a spectrum by means of a re-arranging/permutation scheme, are grouped together to form a slot.

Furthermore, the uplink PUSC zone comprises 36 discontinuous tiles distributed over a frequency band and each tile contains 4 contiguous OFDM symbols. It is possible that several different MSs will conduct their ranging simultaneously in the same ranging frequency zone, resulting in ranging signals from different MSs overlapping in frequency and time.

Figure 3:
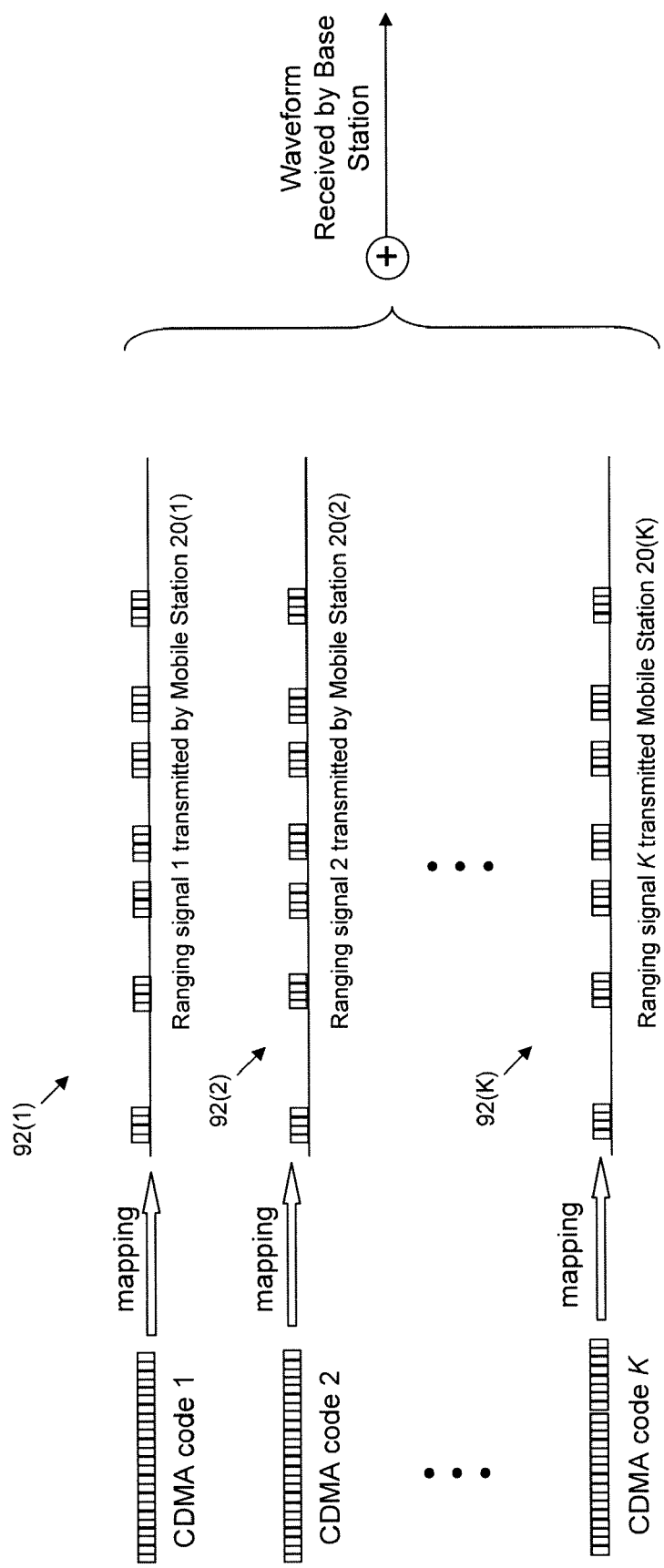
FIG. 3 is a diagram depicting multiple overlapping uplink multi-carrier code division multiple access ranging transmissions from which the base station generates downlink beamforming weight vectors.

Referring to FIG. 3, a diagram is shown that depicts how multiple MSs may transmit uplink ranging signals that overlap in frequency and time. In this example, it is assumed the K ranging codes are being used, such that MS 20(1) selects CDMA code 1 for use in transmitting an uplink ranging signal 92(1), MS 20(2) selects CDMA code 2 for use in transmitting an uplink ranging signal 92(2), . . . , and MS 20(K) selects CDMA code K for use in transmitting an uplink ranging signal 92(P), where K<=Z. When these signals are transmitted at the same time and within the same frequency band, a combined waveform is received at the plurality of antennas of the BS as shown in FIG. 3.

Figure 4:
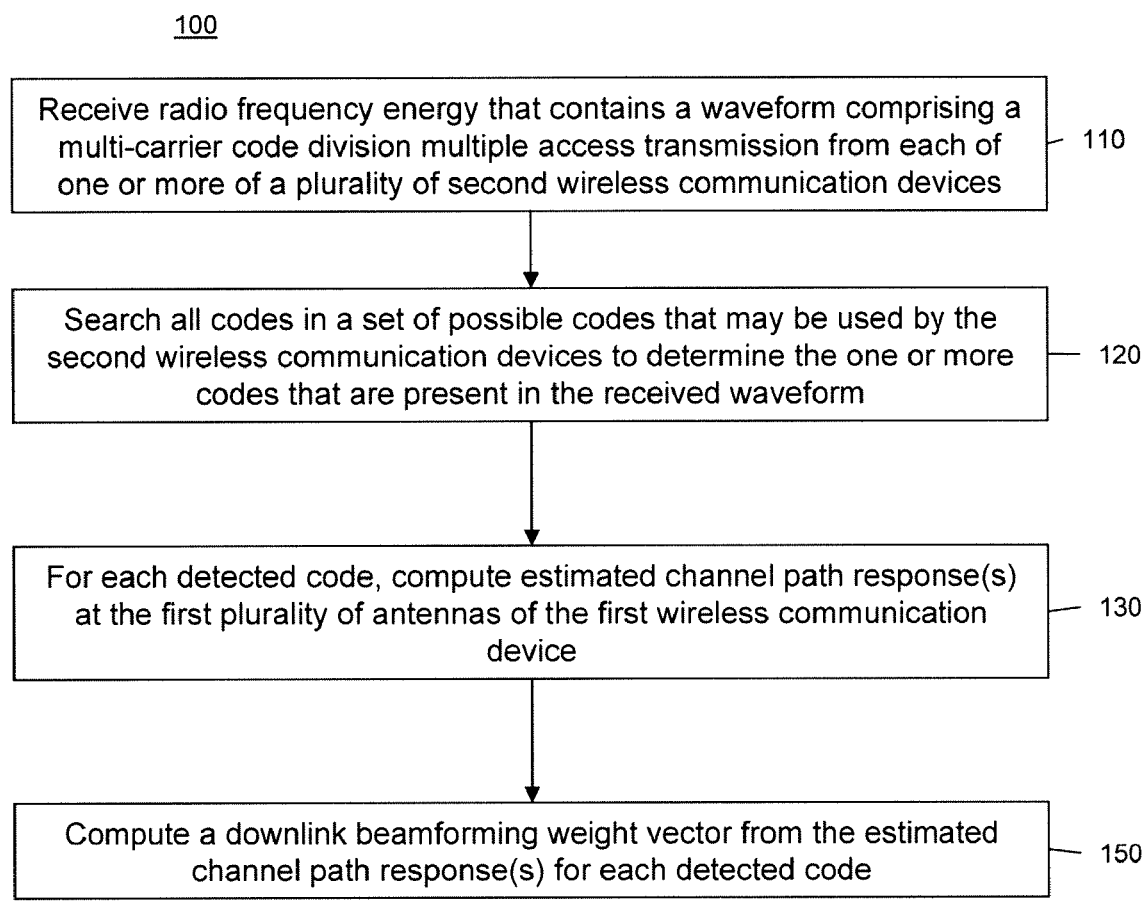
FIG. 4 is a flow chart generally depicting a process for generating downlink beamforming weight vectors from the received ranging transmissions.

Turning now to FIG. 4, the downlink beamforming weight estimation process 100 is now described. At 110, the BS 10 receives at each of its N plurality of antennas 12(1)-12(N) radio frequency energy that contains a waveform comprising one or more (overlapping) MC-CDMA transmissions from one or more MSs. The received waveform at the N antennas of the BS 10 in the frequency domain can be expressed as:

$$y_n(m_i) = \sum_{k=1}^{K} h_{n,k}(m_i)c_k(i) + \omega_n(m_i), \quad (1)$$
$$i = 1, \ldots, 144, n = 1, \ldots, N$$

where $m_i$ is the i-th subcarrier index in the ranging frequency band, K is the number of MSs simultaneously transmitting uplink ranging signals, $c_k$ is the ranging code used by the k-th MS, $h_{n,k}$ is the channel of the n-th antenna of the BS 10 to the k-th ranging MS (assuming that MS has a single antenna), and $\omega_n(m_i)$ is the received noise of the n-th antenna at subcarrier $m_i$. Thus, a receive signal is generated for each of the plurality of antennas that represents the receive waveform received at a corresponding one of the plurality of antennas.

Next, at 120, the BS 10 searches all codes in the set G of possible ranging codes that may be used by the MSs in order to determine which one or more codes are present (actually in use) in the received waveform. This ranging code detection process is described in further detail hereinafter in connection with FIG. 5.

At 130, for each detected ranging code, estimated channel path responses at the plurality of antennas 12(1)-12(N) of the BS 10 are computed. This estimated channel path response computation process is described in further detail hereinafter in connection with FIG. 6.

Then, at 150, the BS computes the downlink beamforming weight vector from the estimated channel path responses computed at 130 for each detected ranging (CDMA) code. The BS 10 uses the downlink beamforming weight vector to beamform a transmission to the MS that used the detected ranging code for an uplink ranging transmission.

Figure 5:
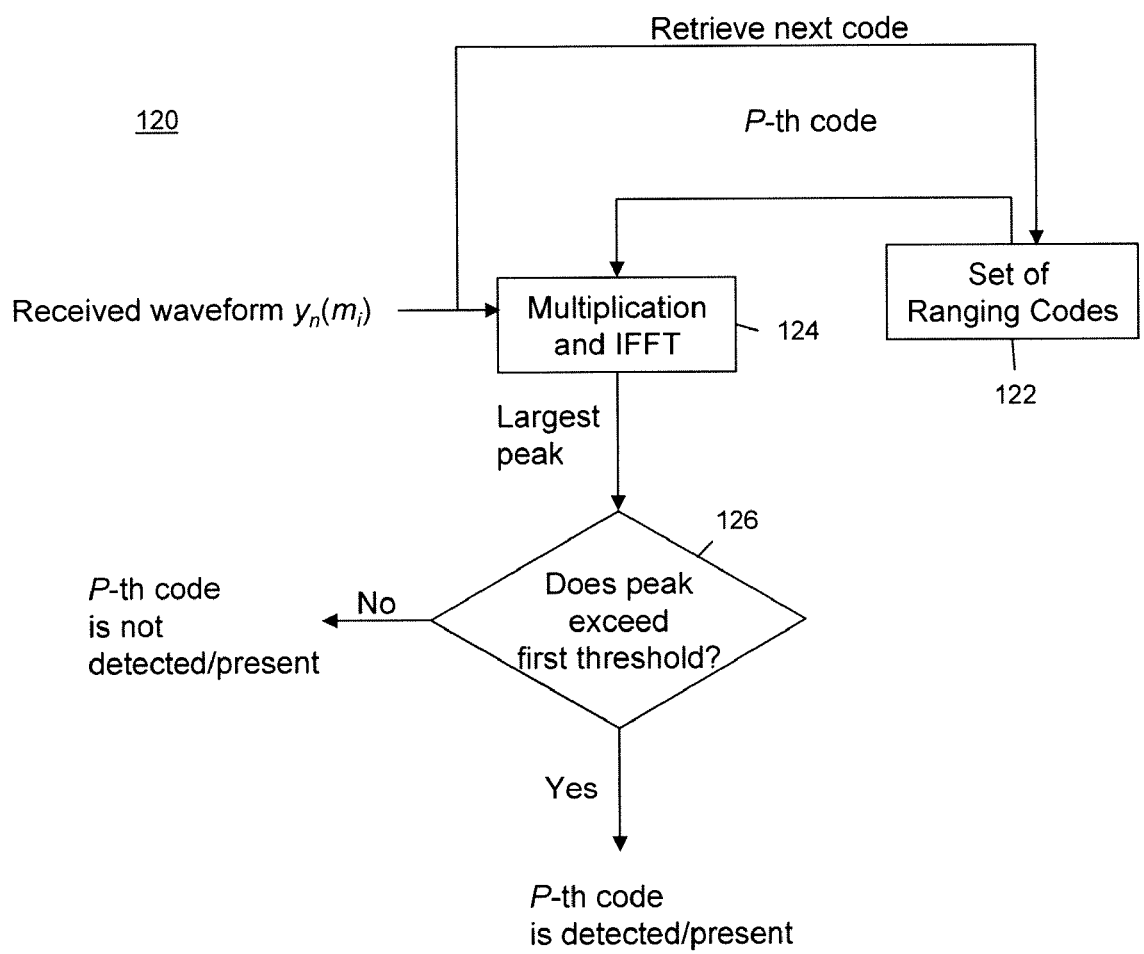
FIG. 5 is a flow chart depicting a process that searches for one or more codes present in the received waveforms.

Turning now to FIG. 5, a process 120 for searching for ranging codes, also referred to herein as ranging code detection, is now described. The BS 10 searches all the CDMA codes in the ranging code group or set G. Thus, at 122, a code is retrieved from the set of ranging codes. At 124, the retrieved code $c_{k_0}$ to be analyzed is multiplied with the received signals in the frequency domain at each antenna of the BS 10, i.e.:

$$s_{n,k_0}(m) = \begin{cases} y_n(m_i) c_{k_0}(i) & \text{when } m \in \{m_1, \ldots, m_{144}\} \\ 0 & \text{otherwise,} \end{cases} \quad (2)$$

where m=1, ..., L is the subcarrier index of the received signal $y_n$ (in the frequency domain) at antenna n, and where $s_{n,k_0}$ is referred to herein as a product signal and is computed for each of the N antennas of the BS 10. Also at 124, the Inverse Fast Fourier Transform (IFFT) is computed for the product signal $s_{n,k_0}$ of equation (1) at each antenna, where:

$$S_{n,k_0}(l) = IFFT(s_{n,k_0}(m)), \quad (3)$$

and l=1, ... L, L is the IFFT size. The IFFT computation essentially converts the product signal to a time domain signal. Thus, the signal $S_{n,k_0}(l)$ is referred to herein as a time domain signal and is produced for each of the plurality of antennas.

To reduce computational complexity, the larger size IFFT computation at 124 (equation (3)) can be replaced by some simple operations, such as a summation operation among some contiguous subcarriers, and a smaller size IFFT computation therefore may be employed.

The maximum value or largest peak $P_{k_0}$ of the function $$\sum_{n=1}^{N} |S_{n,k_0}(l)|$$

with variable l is then computed:

$$P_{k_0} = \max\left(\sum_{n=1}^{N} |S_{n,k_0}(l)|\right). \quad (4)$$

That is, the largest peak in the time domain signals across the plurality of antennas of the BS 10 is computed at 124.

At 126, the largest peak $P_{k_0}$ is compared with a first predetermined threshold $H_1$ to determine whether the ranging code $c_{k_0}$ is contained in the received waveform. The following comparison logic is used to determine whether the ranging $c_{k_0}$ is present in the received waveform:

$$\begin{cases} c_{k_0} \text{ is transmitted} & \text{if } P_{k_0} \geq H_1 \\ c_{k_0} \text{ is not transmitted} & \text{if } P_{k_0} < H_1 \end{cases} \quad (5)$$

When the peak $P_{k_0}$ exceeds the first predetermined threshold $H_1$, the corresponding ranging code $c_{k_0}$ is declared to be present.

The process 120 is repeated for each of the ranging codes until all of the ranging codes in the group G of possible ranging codes have been analyzed. For each ranging code, a determination is made at 126 that the ranging code is present or detected in the received waveform or is not present or detected in the received waveform. The process 120 will produce a list of one or more ranging codes determined to be present in the waveform received at the plurality of antennas of the BS 10. As explained above, the next stage is, for each detected ranging code, to compute one or more estimated channel path responses(s) and to use those channel path responses to compute a downlink beamforming weight vector. This corresponds to the function 130 shown in FIG. 4, and now described in more detail with reference to FIG. 6.

Figure 6:
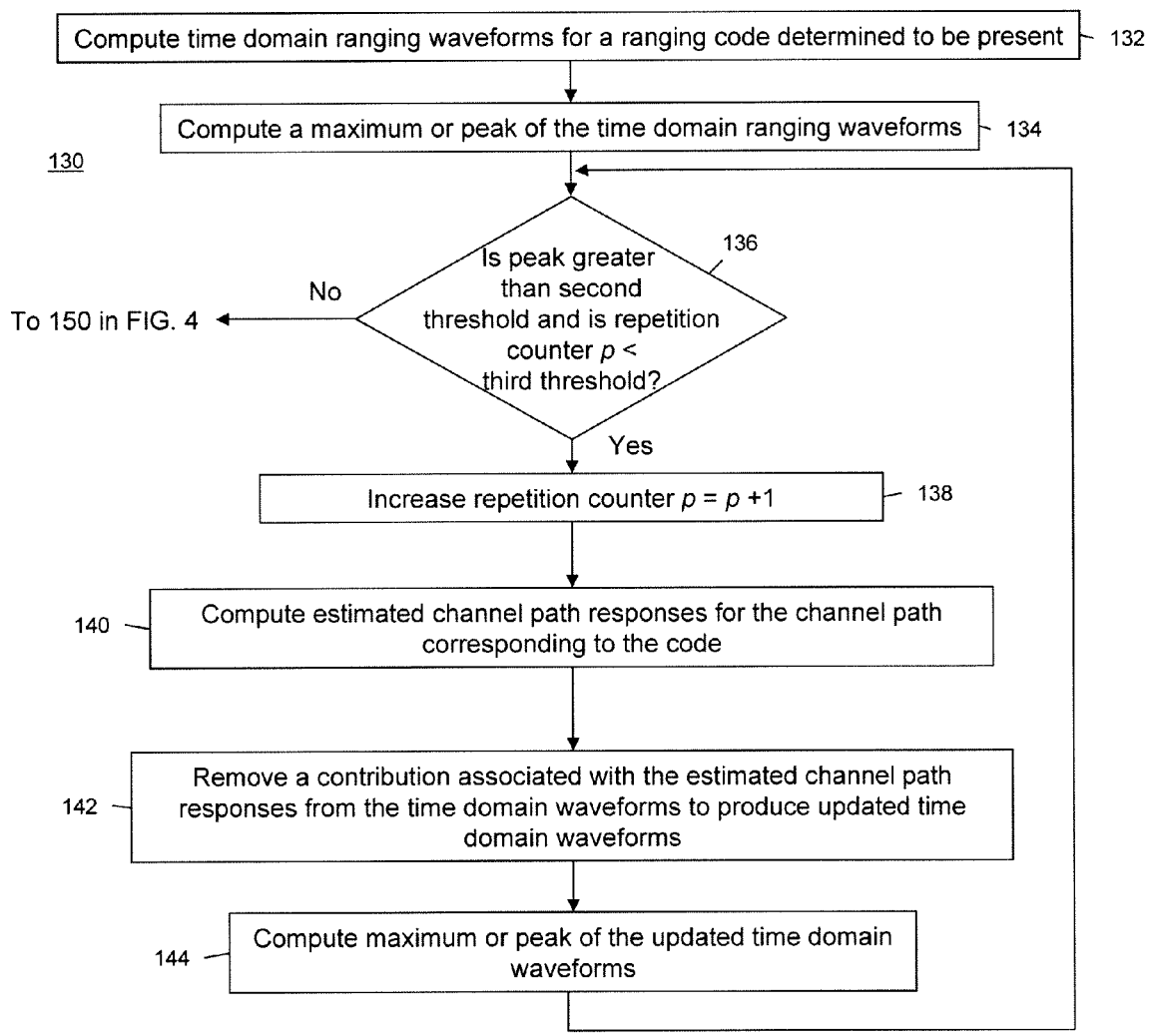
FIG. 6 is a flow chart depicting computation of the beamforming weight vectors for each detected code.

The functions shown in FIG. 6 are performed for each ranging code determined to be present at 120. At 132, a time domain ranging waveform pattern is computed or generated for a ranging code $c_{k_d}$ determined to be present. The time domain ranging waveform pattern is computed for each of the plurality of antennas of the BS 10 and is defined as:

$$S_{\text{ranging}\_0}(l) = \frac{S_0(l)}{\max(|S_0(l)|)}, \, l = 1, \ldots, L, \quad (6)$$

where, $$S_0(l) = IFFT(s_0(m)), \quad (7)$$

$$s_0(m) = \begin{cases} 1 & \text{when } m \in \{m_1, \ldots, m_{144}\} \\ 0 & \text{otherwise} \end{cases}, m = 1, \ldots, L, \quad (8)$$

and $m_i$ is the i-th subcarrier index of the ranging frequency band. The time domain ranging waveform pattern $S_{ranging\_0}(l)$ does not depend on the specific ranging (CDMA) code. It depends only on the ranging channel location, that is, the subcarrier locations that the CDMA code occupies in the frequency domain. Therefore, the BS 10 can compute the time domain ranging waveform pattern $S_{ranging\_0}(l)$ offline and save it.

Next, at 134, a repetition counter p is initialized, p=0, and a maximum or peak $P_{k_d}$ of the time domain ranging waveforms across the plurality of antennas of the BS 10 is computed using equation (4), where the ranging code $c_{k_0}$ is replaced with the current detected ranging code $c_{k_d}$. That is, the maximum or peak $P_{k_d}$ is computed as:

$$P_{k_d} = \max\left(\sum_{n=1}^{N} |S_{n,k_d}(l)|\right)$$

At 136, the maximum/peak $P_{k_d}$ computed at 134 is compared with a second predetermined threshold $H_2$ to determine whether a channel path corresponding to the peak $P_{k_d}$ is reliable. The second threshold $H_2$ is usually less than the first threshold $H_1$. In addition, at 136, the repetition counter p is compared to a third threshold. Obviously, the first pass through the repetition counter p will not exceed the third threshold. The third threshold is a predetermined number, such as 3. The purpose of the third threshold is to reduce the calculation complexity and to search at most "p" dominant paths for each detected ranging code.

If the peak $P_{k_d} < H_2$, then the channel path associated with this peak is said to not be reliable and the process continues to 150 (FIG. 4) to compute the downlink beamforming weight vector based on the detected channel path responses computed up to this point for the current detected ranging code $c_{k_d}$. This downlink beamforming weight vector computation is described in detail hereinafter. The first pass through, the peak $P_{k_d}$ will be greater than the second predetermined threshold $H_2$ because it is greater than the first threshold which is greater than the second threshold if the corresponding code $c_{k_d}$ is detected.

When the peak $P_{k_d}$ is greater than the second predetermined threshold $H_2$ and the repetition counter p is less than a third threshold, then at 138, the repetition counter p is increased (p=p+1) and at 140 an estimated channel path response at each of the plurality of antennas is computed for the current detected ranging code.

At 140, an estimated channel path response is computed as follows. A time delay $\tau_p$ and an estimated channel path response $h_n(\tau_p)$ for that time delay at the n-th antenna of the BS 10 is computed as follows:

$$\tau_p = \underset{l}{\mathrm{argmax}} \left\{ \sum_{n=1}^{N} |S_{n,k_d}(l)| \right\} \quad (9)$$

$$h_n(\tau_p) = S_{n,k_d}(\tau_p), n = 1, \ldots, N \quad (10)$$

The time delay $\tau_p$ corresponds to the p-th path delay of the corresponding MS.

The estimated channel path responses $h_n((\tau_p)$ (n=1, ..., N) is saved or stored for later use as described hereinafter.

At 142, a contribution associated with the estimated channel path response $h_n(\tau_p)$ is removed (subtracted) from the time domain waveform $S_{n,k_d}(l)$, as $$S_{n,k_d}(l) = S_{n,k_d}(l) - h_n(\tau_p) S_{ranging\_\tau_p}(l) \quad (11)$$

$$S_{ranging\_\tau_p} = [S_{ranging\_0}(\tau_p + 1) \quad . \quad . \quad . \quad S_{ranging\_0}(L) \\ S_{ranging\_0}(l) \ldots S_{ranging\_0}(\tau_p)] \quad (11\text{-}a)$$

where $S_{ranging\_\tau_p}$ is a shift of $S_{ranging\_0}$ with length $\tau_p$, and l=1, ..., L, and n=1, ..., N, to compute an updated time domain waveform at each of the plurality of antennas. Thus, the updated time domain ranging waveform at each of the plurality of antennas is computed by removing a contribution associated with the corresponding estimated channel path responses at the plurality of antennas.

At 144, a maximum or peak of the updated time domain waveforms across the plurality of antennas is computed, in much the same manner as the peak computed at 134, to produce an updated peak or maximum value $P_{k_d}$ as:

$$P_{k_d} = \max \left( \sum_{n=1}^{N} |S_{n,k_d}(l)| \right), \quad (12)$$

where the time domain waveform $S_{n,k_d}(l)$ used for the computation at 144, equation (12), is the updated time domain waveform computed at 142 using equation (11). Thus, an updated time domain ranging waveform for each of the plurality of antennas is computed. The process loops back to 136 as shown in FIG. 6 where the updated maximum or peak $P_{k_d}$ computed at 144 and the updated time domain waveform $S_{n,k_d}(l)$ computed at 142 are used again for the comparison at 136. The functions 138, 140, 142 and 144 are repeated for the updated time domain waveform and the updated peak. This loop continues until eventually the updated peak is less than the second predetermined threshold $H_2$ or the repetition counter p is larger than the third predetermined threshold $H_3$. Each pass through the loop generates additional estimated channel path responses (at 140). When the updated peak is determined to be less than the second predetermined threshold $H_2$ or the repetition counter p is greater than the third threshold, the process proceeds to 150 shown in FIG. 4.

At 150, the downlink beamforming weight vector is computed for a particular MS that uses a given ranging code. The beamforming weight vector is computed using the estimated channel path responses $h_n(\tau_p)$ that have a delay $\tau_p$ analogous to the computations of equations 9 and 10. For the subcarrier index k, the beamforming antenna weight is calculated as:

$$w_n(k) = \sum_{p=1}^{P} h_n(\tau_p) e^{-j\frac{2\pi(k-1)(\tau_p-1)}{L}}, \quad (13)$$

$$n = 1, \ldots, N, k = 1, \ldots, L$$

$$w(k) = \frac{w(k)}{\|w(k)\|}, \quad (14)$$

where the downlink beamforming weight vector w(k) is defined as:

$$w(k) = [w_1(k), \ldots, w_N(k)], \quad (15)$$

P is the largest repetition index p, and $\|\cdot\|$ represents the norm of the corresponding vector. Thus, the computations of equations (13)-(15) are made using the estimated channel path responses computed for each ranging code in order to compute the downlink beamforming weight vector for a MS that uses a corresponding ranging code.

After the BS 10 has computed a downlink beamforming weight vector, the BS 10 may apply the downlink beamforming weight vector to downlink signals to be transmitted from the BS 10 to the MS that uses the corresponding ranging code.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
at a first wireless communication device, receiving at each of a plurality of antennas a waveform comprising a multi-carrier code division multiple access ranging transmission from each of one or more of a plurality of second wireless communication devices such that multi-carrier code division multiple access transmissions from two or more second wireless communication devices overlap in time and frequency;
searching all codes in a set of possible codes that may be used by the second wireless communication devices in the one or more multi-carrier code division multiple access ranging transmissions contained in the received waveform;

for each of the one or more codes determined to be present in the received waveform:
  computing estimated channel path responses at each of the plurality of antennas of the first wireless communication device; and
  computing a downlink beamforming weight vector from the estimated channel path responses for a corresponding code.

2. The method of claim 1, wherein receiving comprises generating for each of the plurality of antennas a receive signal representing the received waveform at each of the plurality of antennas.

3. The method of claim 2, wherein searching comprises:
for each code in the set of possible codes, multiplying the code with the receive signal at each of the plurality of antennas to produce a product signal for each antenna;
converting the product signal to a time domain signal for each antenna;
computing a peak in the time domain signals across the plurality of antennas; and
declaring that the code is present when the peak exceeds a first threshold.

4. The method of claim 3, wherein computing estimated channel path responses comprises:
computing a time domain ranging waveform at each of the plurality of antennas for a code determined to be present;
computing a maximum of the time domain ranging waveforms across the plurality of antennas;
comparing the maximum with a second threshold;
when the maximum exceeds the second threshold, computing the estimated channel path responses at the plurality of antennas for the code;
computing an updated time domain ranging waveform at each of the plurality of antennas by removing a contribution associated with the corresponding estimated channel path responses at the plurality of antennas; and
computing a maximum of the updated time domain ranging waveforms across the plurality of antennas.

5. The method of claim 4, and further comprising repeating comparing and computing the estimated channel path responses for the maximum of the updated time domain ranging waveforms across the plurality of antennas and the updated time domain ranging waveform at each of the plurality of antennas.

6. The method of claim 5, wherein repeating further comprises repeating the computing of the updated time domain ranging waveform at each of the plurality of antennas and the maximum of the updated time domain ranging waveforms across the plurality of antennas, and wherein said repeating continues until the maximum of the updated time domain ranging waveforms across the plurality of antennas does not exceed the second threshold or a repetition counter exceeds a third threshold.

7. The method of claim 6, wherein when the maximum does not exceed the second threshold or the repetition counter exceeds the third threshold, further comprising computing for each code determined to be present the downlink beamforming weight vector for the second wireless communication device for the corresponding code using the estimated channel path responses computed for the corresponding code.

8. The method of claim 1, and further comprising applying the beamforming weight vector computed for a code to a signal to be transmitted via the plurality of antennas of the first wireless communication device to one of the plurality of second wireless communication devices that sent a ranging transmission with that code.

9. An apparatus comprising:
a plurality of antennas;
a receiver configured to connect to the plurality of antennas, wherein the receiver is configured to produce a plurality of receive signals for a multi-carrier code division multiple access ranging transmission received at each of the plurality of antennas from each of one or more of a plurality of other wireless communication devices such that multi-carrier code division multiple access transmissions from two or more other wireless communication devices overlap in time and frequency;
a processor configured to connect to the receiver, wherein the processor is configured to:
  search all codes in a set of possible codes that may be used by the second wireless communication devices in the one or more multi-carrier code division multiple access ranging transmissions;
  for each of the one or more codes determined to be used:
    compute estimated channel path responses at each of the plurality of antennas of the first wireless communication device; and
    compute a downlink beamforming weight vector from the estimated channel path responses computed for a corresponding code.

10. The apparatus of claim 9, wherein the processor is configured to search by:
for each code in the set of possible codes, multiplying the code with the receive signal at each of the plurality of antennas to produce a product signal for each antenna;
converting the product signal to a time domain signal for each antenna;
computing a peak in the time domain signals across the plurality of antennas; and
declaring that the code is present when the peak exceeds a first threshold.

11. The apparatus of claim 9, wherein the processor is configured to compute estimated channel path responses by:
computing a time domain ranging waveform at each of the plurality of antennas for a code determined to be present;
computing a maximum of the time domain ranging waveforms across the plurality of antennas;
comparing the maximum with a second threshold;
when the maximum exceeds the second threshold, computing the estimated channel path responses at the plurality of antennas for the code;
computing an updated time domain ranging waveform at each of the plurality of antennas by removing a contribution associated with the corresponding estimated channel path responses at the plurality of antennas; and
computing a maximum of the updated time domain ranging waveforms across the plurality of antennas.

12. The apparatus of claim 11, wherein the processor is configured to repeat comparing and computing the estimated channel path responses for the maximum of the updated time domain ranging waveforms and the updated time domain ranging waveform at each of the plurality of antennas.

13. The apparatus of claim 12, wherein the processor is configured to repeat the computing of the updated time domain ranging waveform and the maximum of the updated time domain ranging waveform until the maximum of the updated time domain ranging waveform does not exceed the second threshold or a repetition counter exceeds a third threshold.

14. The apparatus of claim 13, wherein the processor is configured to, when the maximum does not exceed the second threshold or the repetition counter exceeds the third threshold, compute for each code determined to be present the downlink beamforming weight vector for the second wireless communication device for the corresponding code using the estimated channel path responses computed for the corresponding code.

15. The apparatus of claim 9, wherein the processor is configured to apply the beamforming weight vector computed for a code to a signal to be transmitted via the plurality of antennas of the first wireless communication device to one of the plurality of other wireless communication devices that sent a ranging transmission with that code.

16. One or more non-transitory computer readable storage media encoded with software comprising computer executable instructions and when the software is executed operable to:
  search all codes in a set of possible codes that may be used in a waveform received at each of a plurality of antennas of a first wireless communication device from a multi-carrier code division multiple access ranging transmission sent by each of one or more of a plurality of second wireless communication devices such that multi-carrier code division multiple access transmissions from two or more second wireless communication devices overlap in time and frequency;
  for each of the one or more codes determined to be used in the received waveform:
    compute estimated channel path responses at each of the plurality of antennas of the first wireless communication device; and
    compute a downlink beamforming weight vector from the estimated channel path responses computed for a corresponding code.

17. The non-transitory computer readable storage media of claim 16, further comprising instructions that are operable to:
  for each code in the set of possible codes, multiply the code with the receive signal at each of the plurality of antennas to produce a product signal for each antenna;
  convert the product signal to a time domain signal for each antenna;
  compute a peak in the time domain signals across the plurality of antennas; and
  declare that the code is present when the peak exceeds a first threshold.

18. The non-transitory computer readable storage media of claim 17, wherein the instructions that are operable to compute the estimated channel path responses comprise instructions operable to:
  compute a time domain ranging waveform at each of the plurality of antennas for a code determined to be present;
  compute a maximum of the time domain ranging waveforms across the plurality of antennas;
  compare the maximum with a second threshold;
  when the maximum exceeds the second threshold, compute the estimated channel path responses at the plurality of antennas for the code;
  compute an updated time domain ranging waveform at each of the plurality of antennas by removing a contribution associated with the corresponding estimated channel path responses at the plurality of antennas; and
  compute a maximum of the updated time domain ranging waveforms across the plurality of antennas.

19. The non-transitory computer readable storage media of claim 18, further comprising instructions that are operable to: repeat the comparing of the maximum with the second threshold and computing of the estimated channel path responses for the maximum of the updated time domain ranging waveform across the plurality of antennas and the updated time domain ranging waveform at each of the plurality of antennas.

20. The non-transitory computer readable storage media of claim 19, further comprising instructions that are operable to: repeat the computing of the updated time domain ranging waveform at each of the plurality of antennas and the maximum of the updated time domain ranging waveforms across the plurality of antennas until the maximum of the updated time domain ranging waveforms across the plurality of antennas does not exceed the second threshold or a repetition counter exceeds a third threshold.

21. The non-transitory computer readable storage media of claim 20, further comprising instructions that are operable to compute for each code determined to be present the downlink beamforming weight vector for the second wireless communication device for the corresponding code using the estimated channel path responses computed for the corresponding code when the maximum does not exceed the second threshold or the repetition counter exceeds the third threshold.

22. The non-transitory computer readable storage media of claim 21, further comprising instructions that are operable to apply the downlink beamforming weight vector computed for a code to a signal to be transmitted via the plurality of antennas of the first wireless communication device to one of the plurality of second wireless communication devices that sent a ranging transmission with that code.

* * * * *